July 22, 1969     I. K. POKHODNYA ET AL     3,457,388
ELECTRODE FOR WELDING AND BUILDING UP METALS AND THEIR ALLOYS
Filed Aug. 11, 1965
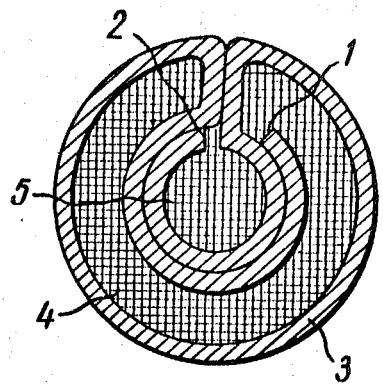
INVENTOR:
Igor Konstantinovich Pokhodnya,
et al
BY:
Blacock, Downing n Seebold
ATTORNEYS

United States Patent Office 3,457,388
Patented July 22, 1969

3,457,388
ELECTRODE FOR WELDING AND BUILDING UP METALS AND THEIR ALLOYS
Igor Konstantinovich Pokhodnya, ulitsa Mechnikova 3, kv. 19, and Valery Nikolaevich Shlepakov, ulitsa Pushkinskaya 45, kv. 9, both of Kiev, U.S.S.R.
Filed Aug. 11, 1965, Ser. No. 478,944
Int. Cl. B23k 35/38, 35/36, 35/04
U.S. Cl. 219—146                                      1 Claim

ABSTRACT OF THE DISCLOSURE

An electrode for welding and building up metals and their alloys in which an envelope of a metal ribbon is rolled up so that it defines two concentrically arranged casings with the internal casing accommodating a core preferably of alloying and deoxidizing materials while the outer casing accommodates materials protecting the weld metal during the welding operation. The edges of the ribbon, when being rolled up, are bent inwardly in such a fashion that such edges embrace the core, overlap and interlock each other.

---

The present invention relates to electrodes for welding and building up metals and their alloys, and more particularly for mechanized (automatic and semiautomatic) welding and building up metals and their alloys.

In the art there are known electrodes for welding and building up metals and their alloys, in which the electrodes have a tubular design, and comprise an envelope of a metal ribbon and a core constituted preferably of a powdered mixture of protecting, alloying and deoxidizing materials.

A disadvantage of such electrodes is that during the welding, the core melts down at a slower rate than the metal envelope, which results in impairing the protection of the molten metal when welding and, hence, the quality of the weld thus produced.

There is also known the practice of bending inwards the edges of the metal envelope so as to insure a more uniform melting of the core and envelope, and this results in dividing the core into several portions. Such a design of the electrode, as well as of the above mentioned electrodes, does not provide a reliable protection of the molten metal.

There are known electrodes for welding and building up metals and their alloys, in which the envelope is rolled of a metal ribbon in such a mannr that it forms two concentrically arranged casings, with the internal casing accommodating a core comprising preferably the alloying and deoxidizing materials, while the external casing, the materials protecting the molten metal when the welding operation is effected. When rolling up the envelope, the edges of the ribbon are disposed outside, which results in opening the junction of the edges of the envelope and, hence, the spelling of the materials from the internal casing when said electrodes are employed to effect the automatic and semi-automatic welding. The protection of the molten metal is thereby impaired. This disadvantage is especially pronounced when manufacturing an electrode provided with an envelope using a thin metal ribbon, about 0.25 mm. and less, i.e., having the most advantageous thickness, for the metal envelope functions under worse conditions of protection against air than the core. The known electrodes employ cores made only of a metal wire having a solid cross section, which interferes with the uniform melting of the electrode, with the thin external metal envelope melting down faster than the core.

An object of the present invention is to provide such an electrode for welding and building up metals and their alloys, which is capable of uniformly melting down during the welding operation.

Another object of the present invention is the provision of such an electrode for welding and building up metals and their alloys, which provides a reliable protection of the molten metal against the atmospheric air.

A further object of the present invention is to provide such an electrode for welding and building up metals and their alloys, which insures a high quality of the weld metal when welding without having recourse to any additional protection.

Another important object of the present invention is the provision of such an electrode for welding and building up metals and their alloys, which provides for controlling the composition and properties of the weld metal.

Yet another object of the present invention is to provide such an electrode for welding and building up metals and their alloys, which allows automatic welding with the use of great density currents at a high welding rate.

According to the above-mentioned and other objects, the proposed electrode for welding and building up metals and their alloys has an envelope of a metal ribbon rolled up in such a manner that it defines two concentrically arranged casings, the internal casing accommodating a core preferably alloying and deoxidizing materials, while the external casing, contains materials protecting the weld metal during the welding operation with the edges of the metal ribbon being rolled up in such a manner that they envelope the core with the edges of the ribbon being disposed one on the other.

The core, being at least once encircled by the edges of the ribbon, is essentially a powdered mixture, composed preferably of powders of metals and their alloys.

Hence, the proposed invention allows the manufacture of an electrode capable of uniformly melting down over its cross section, providing a high rate of fusion, thereby a reliable protection of the molten metal against air without the use of additional protecting means, such as gas or flux, and a high quality of the weld metal.

The fact that the core is made up of a powdered mixture allows practically any compositions of the core material to be obtained and, hence, of the weld metal, which is impracticable when using electrodes provided with a core made up of a wire having a solid cross section.

The present invention will become more fully apparent from a consideration of the following description thereof, taken in conjunction with the appended drawing in which the sole figure is a cross-sectional view of the electrode of the invention.

Edges 1 and 2 of a metal ribbon 3, which define the envelope, are bent inwardly in such a manner that they form two concentrically arranged casings 4 and 5. The internal casing 5 houses or contains a core made up of a powdered mixture of alloying and deoxidizing materials, while the external casing 4 accommodates materials protecting the weld metal during the welding operation.

The fact that two mixtures, composed, for example, one (placed into the casing 4) of protecting materials, and the other (placed into the casing 5) of alloying and deoxidizing materials, are introduced into the electrode, facilitates the task of providing a reliable protection of the molten metal during the welding operation against oxygen and nitrogen, insures a good formation of the weld, an easy peeling of the slag crust, and a minimum splashing of the electrode metal.

The design of the electrode, featuring the inwardly bent edges of the metal ribbon, contributes to a uniform melting of the electrode.

The design of the electrode according to the present invention allows its application both as single electrodes and as a continuous electrode for the automatic and semiautomatic welding processes. In the automatic or semiautomatic welding process, the continuous electrode of the proposed design enables the welding to be performed with the use of great density currents at a high welding rate.

TABLE

| Characteristics, design of electrode | Welding conditions | | Tensile strength, kg./mm.² | Elongation, percent | Impact value (according to Mesnager), kgm./cm.² | Content of nitrogen in the weld metal, percent |
|---|---|---|---|---|---|---|
| | Welding current, a. | Arc voltage, v. | | | | |
| Tubular | 360–370 | 23–25 | 56.9–58.7 | 20.4–22.5 | 13.6–14.8 | 0.029–0.032 |
| | | | 57.6 | 21.3 | 14.1 | |
| | 420–440 | 25–27 | 51.2–52.8 | 19.9–24.5 | 14.4–16.0 | 0.024–0.035 |
| | | | 52.2 | 22.7 | 15.2 | |
| | 350–370 | 24–28 | 59.4–53.4 | 24.7–31.8 | 19.2–20.0 | 0.014–0.022 |
| | | | 53.0 | 28.6 | 19.7 | |
| Proposed | 430–450 | 26–30 | 53.3–57.3 | 23.6–28.2 | 20.5–24.2 | 0.017–0.029 |
| | | | 54.9 | 26.3 | 22.3 | |

NOTE.—As to tests for tensile strength and impact value, the numerator represents the extreme values of test results when testing 3 to 4 specimens, while the denominator states the average values thereof.

The above comparative table shows to what extent the welding results are improved when using an electrode of the proposed design as compared with the existing electrode of the tubular design.

The welding operation is carried out in the flat position by means of a welding machine. The continuous electrodes are 2.8 mm. in diameter; the metal to be welded is a low-carbon, structural steel of the grade steel 3. Welding current for maintaining the electric arc may be a reversed polarity direct current.

A better protection against the atmospheric air in the electrodes of the proposed design as compared to the existing ones, allows the sensitivity to disturbances in the welding conditions to be decreased, for example, when the arc voltage varies. This fact is of importance for the semiautomatic welding with the use of a continuous electrode where the normal performance of the welding largely depends on the skill of the welder.

Whenever it is required to control the strength of the weld metal or to impart special properties thereto, for example, wear resistance, resistance to corrosion, and heat resistance, the pertinent powdered materials are introduced into the core of the electrode of the proposed design.

What is claimed is:
1. An electrode for welding and building up metals and their alloys, comprising an envelope of a metal ribbon having edges, said ribbon being rolled up so that the ribbon defines two concentrically arranged casings, one of said casings accommodating a core containing preferably alloying and deoxidizing materials, the other of said casings containing materials protecting the weld of metal during the welding operation, and the edges of the ribbon defining the casings being rolled up so that said ribbon envelops said core with the edges being disposed one on the other and interlocking each other.

References Cited

UNITED STATES PATENTS

| 1,265,453 | 5/1918 | Jones | 219—146 |
| 2,345,758 | 4/1944 | Lincoln et al. | 219—146 |
| 2,465,503 | 3/1949 | Woods | 219—146 |
| 2,565,477 | 8/1951 | Crowell et al. | 219—146.5 |
| 3,036,205 | 5/1962 | Aida et al. | 219—145 X |
| 3,118,053 | 1/1964 | Arikawa et al. | 219—146 |

FOREIGN PATENTS 1,052,714  12/1966  Great Britain.

JOSEPH V. TRUHE, Primary Examiner

B. A. STEIN, Assistant Examiner

U.S. Cl. X.R.

211—16; 219—455, 520